(12) United States Patent
Hao et al.

(10) Patent No.: US 10,110,490 B2
(45) Date of Patent: Oct. 23, 2018

(54) METHOD AND APPARATUS FOR FORWARDING PACKET

(71) Applicant: Huawei Technologies Co., Ltd., Shenzhen (CN)

(72) Inventors: Weiguo Hao, Nanjing (CN); Yizhou Li, Nanjing (CN); Hui Ni, Beijing (CN); Shibi Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 131 days.

(21) Appl. No.: 15/243,108

(22) Filed: Aug. 22, 2016

(65) Prior Publication Data
US 2016/0359745 A1    Dec. 8, 2016

Related U.S. Application Data

(63) Continuation of application No. PCT/CN2014/086173, filed on Sep. 10, 2014.

(30) Foreign Application Priority Data

Feb. 20, 2014 (CN) .......................... 2014 1 0058013

(51) Int. Cl.
*H04L 12/741* (2013.01)
*H04L 12/46* (2006.01)
*H04L 12/715* (2013.01)
*H04L 29/12* (2006.01)

(52) U.S. Cl.
CPC ............ *H04L 45/745* (2013.01); *H04L 12/46* (2013.01); *H04L 12/4633* (2013.01); (Continued)

(58) Field of Classification Search
CPC ........... H04L 29/0653; H04L 29/06095; H04L 49/3009; H04L 49/309; H04L 45/74
See application file for complete search history.

(56) References Cited

U.S. PATENT DOCUMENTS 8,937,950 B2 * 1/2015 Dunbar ................. H04L 12/462
370/392
9,300,582 B2 * 3/2016 Grover .................... H04L 45/64
(Continued)

FOREIGN PATENT DOCUMENTS

CN     101110745 A    1/2008
CN     101888625 A    11/2010
(Continued)

OTHER PUBLICATIONS

Gu, Y., et al., "The mechanism and signalling between TES and NVE," draft-gu-nvo3-tes-nve-mechanism-01, Oct. 19, 2012, 24 pages.
(Continued)

*Primary Examiner* — Hassan Phillips
*Assistant Examiner* — Prenell Jones
(74) *Attorney, Agent, or Firm* — Conley Rose, P.C.

(57) ABSTRACT

A method and an apparatus for forwarding a packet, where a first network virtualization edge (NVE) receives a first packet sent by a first tenant end system (TES), where a destination Internet Protocol (IP) address of the first packet is an IP address of a second TES, a destination media access control (MAC) address of the first packet is a gateway MAC address corresponding to the first NVE. The first NVE acquires an access virtual network identifier (VN ID) and a layer 3 virtual private network (VPN) instance identifier of the first TES, and searches a routing and forwarding table, to obtain an entry corresponding to the IP address of the second TES. Then the first NVE encapsulates the first packet into a network virtualization overlays (NVO3) packet according to the entry, and forwards the NVO3 packet to a second NVE to forward to the second TES.

18 Claims, 8 Drawing Sheets

(52) U.S. Cl.
CPC ...... *H04L 12/4641* (2013.01); *H04L 12/4645* (2013.01); *H04L 45/64* (2013.01); *H04L 61/103* (2013.01); *H04L 61/6022* (2013.01)

(56) References Cited

U.S. PATENT DOCUMENTS

| | | |
|---|---|---|
| 2010/0290398 A1 | 11/2010 | Choudhary et al. |
| 2013/0173788 A1 | 7/2013 | Song |
| 2014/0169368 A1* | 6/2014 | Grover .................. H04L 45/745 370/392 |
| 2015/0078387 A1* | 3/2015 | Dunbar ................. H04L 12/462 370/392 |
| 2015/0188769 A1 | 7/2015 | Gu |

FOREIGN PATENT DOCUMENTS

| | | |
|---|---|---|
| CN | 103200069 A | 7/2013 |
| CN | 103428038 A | 12/2013 |
| CN | 103580980 A | 2/2014 |

OTHER PUBLICATIONS

Black, D., et al., "An Architectures for Overlay Networks (NVO3)," draft-ietf-nvo3-arch-01, Feb. 14, 2014, 32 pages.
Foreign Communication From a Counterpart Application, European Application No. 14883484.9, Extended European Search Report dated Feb. 2, 2017, 10 pages.
Foreign Communication From a Counterpart Application, PCT Application No. PCT/CN2014/086173, English Translation of International Search Report dated Dec. 23, 2014, 2 pages.
Foreign Communication From a Counterpart Application, PCT Application No. PCT/CN2014/086173, English Translation of Written Opinion dated Dec. 23, 2014, 7 pages.
Machine Translation and Abstract of Chinese Publication No. CN103428038, Dec. 4, 2013, 33 pages.
Foreign Communication From a Counterpart Application, Chinese Application No. 201410058013.4, Chinese Office Action dated Nov. 3, 2017, 6 pages.

* cited by examiner

| VPN instance identifier | Global VN ID | Access VN ID |
|---|---|---|
| VPN 30 | VN 30 | VN 31 |
| VPN 30 | VN 30 | VN 32 |
| VPN 30 | VN 30 | VN 33 |
| VPN 300 | VN 300 | VN 310 |
| VPN 300 | VN 300 | VN 320 |
| VPN 300 | VN 300 | VN 330 |

METHOD AND APPARATUS FOR FORWARDING PACKET

CROSS-REFERENCE TO RELATED APPLICATIONS

This application is a continuation of international patent application number PCT/CN2014/086173 filed on Sep. 10, 2014, which claims priority to Chinese patent Application number 201410058013.4 filed on Feb. 20, 2014, both of which are incorporated by reference.

TECHNICAL FIELD

Embodiments of the present disclosure relate to network technologies, and in particular, to a method and an apparatus for forwarding a packet in a network virtualization overlays (NVO3) network.

BACKGROUND

NVO3 is a technology for implementing network virtualization. A physical network can be virtualized using the NVO3 technology such that one physical network can be shared by different tenants, where data flows of the tenants are segregated from each other, and Internet Protocols (IPs) in virtual networks (VNs) used by different tenants can be the same, which is equivalent to that each tenant uses the physical network independently.

In a network using the NVO3 technology, each tenant generally includes one or more VNs, where layer 2 (a data link layer) interworking between tenant end systems (TESs) in each VN can be implemented using an NVO3 network, and interworking between TESs in different VNs is implemented using layer 3 network (a network layer). A network virtualization edge (NVE) is a VN edge device of an NVO3 network, and is responsible for flow forwarding between different TESs in each VN, NVO3 tunnel encapsulation and decapsulation, and other processing.

At present, each layer 3 data flow to be transmitted across subnets in an NVO3 network generally needs to be forwarded using a centralized layer 3 gateway. However, if each layer 3 data flow to be transmitted across subnets is forwarded using a centralized layer 3 gateway, a detour may be caused on a forwarding path of the layer 3 data flow, and a forwarding bottleneck may be easily formed at the centralized layer 3 gateway, thereby affecting efficiency of packet forwarding.

SUMMARY

The present disclosure provides a method and an apparatus for forwarding a packet, which are used to improve efficiency of packet forwarding.

A first aspect provides a method for forwarding a packet, including receiving, by a first NVE, a first packet sent by a first TES, where a destination IP address of the first packet is an IP address of a second TES, a destination media access control (MAC) address of the first packet is a gateway MAC address corresponding to the first NVE, and the first TES and the second TES belong to a same layer 3 virtual private network (VPN), acquiring, by the first NVE, an access VN identifier (VN ID) of the first TES according to at least one of information about a port receiving the first packet and the first packet, and acquiring a layer 3 VPN instance identifier of the first TES according to the access VN ID of the first TES, performing, by the first NVE, layer 2 termination on the first packet, searching, according to the IP address of the second TES, a routing and forwarding table corresponding to the layer 3 VPN instance identifier of the first TES, to obtain an entry corresponding to the IP address of the second TES, and encapsulating the first packet into an NVO3 packet according to the entry, and forwarding, by the first NVE, the NVO3 packet to a second NVE using a layer 3 network, where the second TES is connected to the second NVE.

A second aspect provides a method for forwarding a packet, including receiving, by a second NVE, an NVO3 packet sent by a first NVE, where the NVO3 packet is obtained by the first NVE by performing NVO3 encapsulation on a first packet sent by a first TES, and a destination IP address of the first packet is an IP address of a second TES, decapsulating, by the second NVE, the NVO3 packet, to obtain a decapsulated packet when a destination IP address in the NVO3 header of the NVO3 packet is an IP address of the second NVE, where the decapsulated packet is obtained after the first NVE replaces a destination MAC address of the first packet with a gateway MAC address corresponding to the second NVE and replaces a source MAC address of the first packet with a gateway MAC address corresponding to the first NVE, performing, by the second NVE, layer 2 termination on the decapsulated packet, acquiring, by the second NVE according to a global VN ID in the NVO3 header of the NVO3 packet, a layer 3 VPN instance identifier corresponding to the global VN ID, and searching, by the second NVE, a routing and forwarding table according to the layer 3 VPN instance identifier and the IP address of the second TES, and forwarding the decapsulated packet to the second TES.

A third aspect provides an apparatus for forwarding a packet, including a receiving module configured to receive a first packet sent by a first TES, where a destination IP address of the first packet is an IP address of a second TES, a destination MAC address of the first packet is a gateway MAC address corresponding to a first NVE, and the first TES and the second TES belong to a same layer 3 VPN, a first acquiring module configured to acquire an access VN ID of the first TES according to at least one of information about a port receiving the first packet and the first packet, a second acquiring module configured to acquire a layer 3 VPN instance identifier of the first TES according to the access VN ID of the first TES, an encapsulation module configured to perform layer 2 termination on the first packet, search, according to the IP address of the second TES, a routing and forwarding table corresponding to the layer 3 VPN instance identifier of the first TES, to obtain an entry corresponding to the IP address of the second TES, and encapsulate the first packet into an NVO3 packet according to the entry, and a sending module configured to forward the NVO3 packet to a second NVE using a layer 3 network, where the second TES is connected to the second NVE.

A fourth aspect provides an apparatus for forwarding a packet, where the apparatus for forwarding a packet is an NVE and includes a receiving module configured to receive an NVO3 packet sent by another NVE, where the NVO3 packet is obtained by the other NVE by performing NVO3 encapsulation on a first packet sent by a first TES, and a destination IP address of the first packet is an IP address of a second TES, a decapsulation module configured to decapsulate the NVO3 packet, to obtain a decapsulated packet when a destination IP address in the NVO3 header of the NVO3 packet is an IP address of the NVE, where the decapsulated packet is obtained after the other NVE replaces a destination MAC address of the first packet with a gateway MAC address corresponding to the NVE and replaces a source MAC address of the first packet with a gateway MAC address corresponding to the other NVE, a termination module configured to perform layer 2 termination on the decapsulated packet, an acquiring module configured to acquire, according to a global VN ID in the NVO3 header of the NVO3 packet, a layer 3 VPN instance identifier corresponding to the global VN ID, and a forwarding module configured to search a routing and forwarding table according to the layer 3 VPN instance identifier and the IP address of the second TES, and forward the decapsulated packet to the second TES.

In a first possible implementation manner of the fourth aspect, the apparatus further includes a setting module configured to locally generate a table of a correspondence between layer 3 VPN instance identifiers and global VN IDs, and the acquiring module is further configured to search the table of the correspondence between layer 3 VPN instance identifiers and global VN IDs according to the global VN ID, to obtain the layer 3 VPN instance identifier corresponding to the global VN ID.

According to the method and the apparatus for forwarding a packet that are provided in the embodiments of the present disclosure, in an NVO3 network, each NVE is used as a gateway for a TES locally connected, and when data is transmitted between TESs across VNs, NVEs locally connected to the TESs are separately used as gateways such that a packet to be transmitted between the TESs across the VNs does not need to be forwarded using a centralized layer 3 gateway, and can be directly transmitted between the NVEs locally connected to the TESs, thereby reducing detours of a data flow and improving efficiency of packet forwarding.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure.

In an NVO3 network, one tenant generally corresponds to one layer 3 VPN, layer 3 VPNs corresponding to different tenants are segregated from each other on each NVE using a virtual routing and forwarding (VRF) table, and one VPN may include multiple VNs. One VN corresponds to one subnet segment, and is identified using a VN ID of 24 bits.

Figure 1:
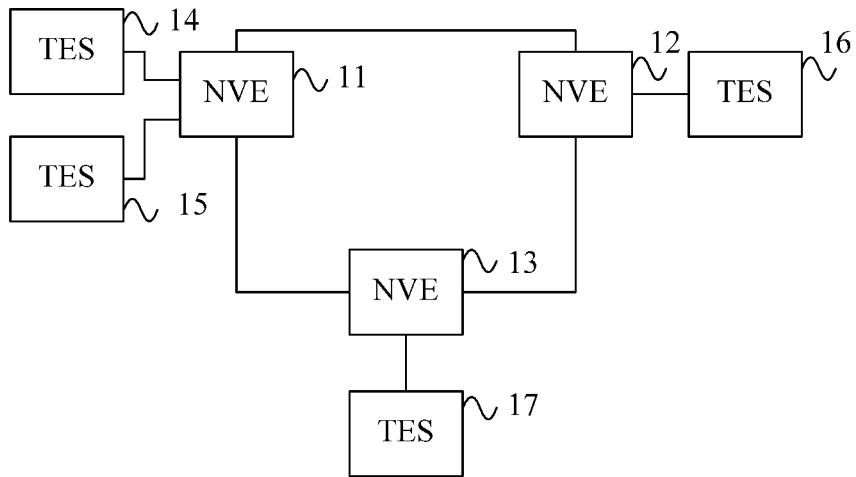
FIG. 1 is a schematic architectural diagram of an NVO3 network.

FIG. 1 is a schematic architectural diagram of an NVO3 network. As shown in FIG. 1, the NVO3 network includes an NVE 11, an NVE 12, and an NVE 13, where a TES 14 and a TES 15 are connected to the NVE 11, a TES 16 is connected to the NVE 12, and a TES 17 is connected to the NVE 13. The NVE 11, NVE 12, and NVE 13 are connected to each other using a layer 3 network, the TES 14 and TES 15, TES 16, and TES 17 are connected to the NVE 11, NVE 12, and NVE 13 respectively using a layer 2 network. It should be noted that quantities of NVEs and TESs in the NVO3 network are not limited to FIG. 1.

Figure 2:
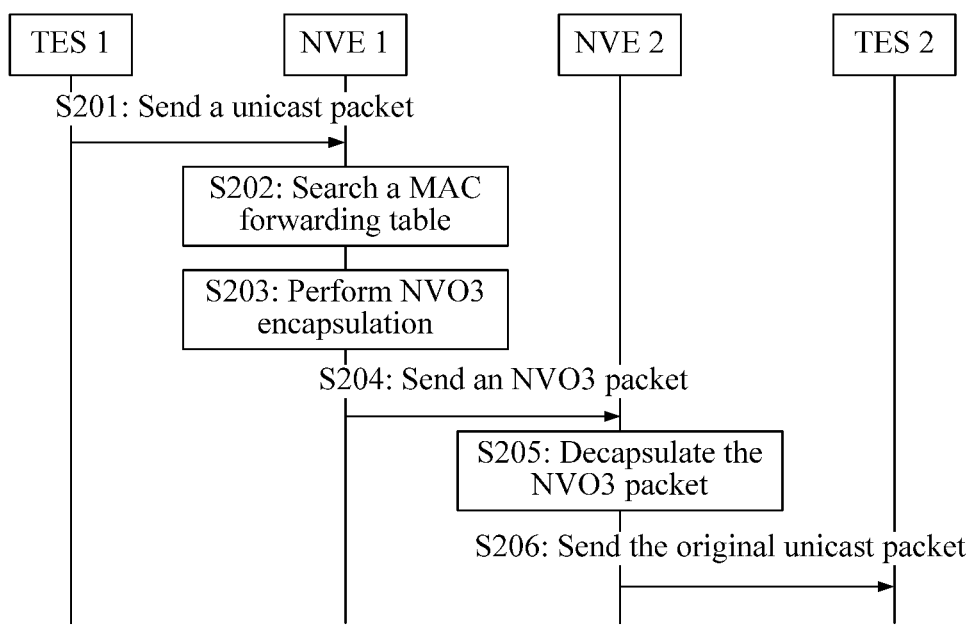
FIG. 2 is a schematic flowchart for forwarding a layer 2 packet in an NVO3 network.

FIG. 2 is a schematic flowchart for forwarding a layer 2 packet in an NVO3 network. As shown in FIG. 2, it is assumed that a TES 1 and a TES 2 belong to a same VN of a same tenant, where the TES 1 is connected to an NVE 1, and the TES 2 is connected to an NVE 2. A process of unicast communication between the TES 1 and the TES 2 is as follows.

Step S201: The NVE 1 receives a unicast packet sent by the TES 1, where a destination MAC address of the unicast packet is a MAC address of the TES 2.

Furthermore, in this step, it is assumed that the NVE 1 already completes MAC address learning in the VN that the TES 1 belongs to. Because the TES 1 is connected to the NVE 1, all packets sent by the TES1 can be received by the NVE 1.

Step S202: The NVE 1 searches a MAC forwarding table, and learns that the TES 2 corresponding to the destination MAC address of the unicast packet is connected to the remote NVE 2.

Step S203: The NVE 1 performs NVO3 encapsulation on the unicast packet, to obtain an NVO3 packet.

Furthermore, because the unicast packet sent by the TES 1 is sent to the TES 2 connected to the remote NVE 2, but the packet sent by the TES 1 to the NVE 1 is a layer 2 packet, and the NVE 1 and the NVE 2 are connected to each other using a layer 3 network, the NVE 1 cannot directly transmit the layer 2 packet to the NVE 2. Therefore, the NVE 1 needs to encapsulate the unicast packet into an NVO3 packet before transmission.

Typical NVO3 encapsulation includes virtual extensible local area network (VXLAN) and network virtualization using generic routing encapsulation (NVGRE), where VXLAN uses a MAC in User Datagram Protocol (MAC-in-UDP) encapsulation manner, and NVGRE uses a MAC in generic routing encapsulation (MAC-in-GRE) encapsulation manner, and each encapsulation header includes a VN ID of 24 bits.

Step S204: The NVE 1 sends the NVO3 packet to the NVE 2.

Step S205: The NVE 2 decapsulates the NVO3 packet, to obtain the unicast packet, and acquires the destination MAC address of the unicast packet.

Step S206: The NVE 2 forwards the unicast packet to the TES 2 by searching a local MAC forwarding table according to the destination MAC address of the unicast packet.

FIG. 2 shows a procedure for forwarding a packet between TESs that belong to a same VN in an NVO3 network. However, for packet forwarding between TESs that do not belong to a same VN, each NVE connected to a TES sending a packet needs to send the packet to a centralized layer 3 gateway in a network, and then the centralized layer 3 gateway forwards the packet to an NVE to which a destination TES is connected, such a flow forwarding manner may cause a detour on a flow forwarding path and may easily form a forwarding bottleneck.

Based on the foregoing problem, an embodiment of the present disclosure provides a method for forwarding a packet in an NVO3 network such that each NVE in the network can be used as a gateway device, and not each packet to be transmitted across VNs needs to be sent to a centralized layer 3 gateway for forwarding, thereby achieving optimal forwarding of a flow to be transmitted across VNs.

One NVE may be in multiple VPNs at the same time, and different VPNs are segregated from each other on the NVE using VRF instances. Each VPN, segregated using VRF instances, in an NVE is referred to as a layer 3 VPN instance in the NVE, and each layer 3 VPN instance includes multiple VNs. An NVE needs to set a corresponding identifier for each local layer 3 VPN instance and set a corresponding VN ID for each local VN. In order that a packet in a same VPN can be transmitted between different NVEs across VNs, a global VN ID needs to be set for each VPN, that is, for a same layer 3 VPN on different NVEs, different layer 3 VPN instance identifiers may be set, but a same global VN ID needs to be set, where the global VN ID may be determined by the different NVEs through negotiation or may be specified by a management center. The VN ID set by the NVE for each local VN is used for access by a local TES, and is therefore referred to as an access VN ID.

Figures 3, 4:
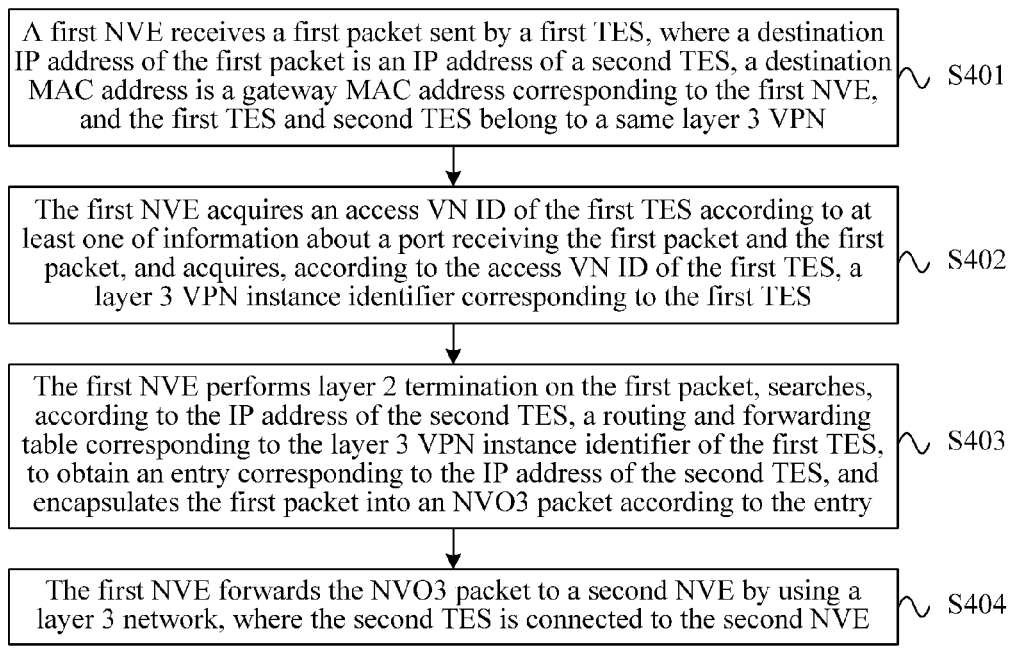
FIG. 3 is a schematic diagram of a correspondence set on an NVE.
FIG. 4 is a flowchart of Embodiment 1 of a method for forwarding a packet according to an embodiment of the present disclosure.

As shown in FIG. 3, FIG. 3 is a schematic diagram of a correspondence set on an NVE. It is assumed that an NVE includes two layer 3 VPN instances, and identifiers of the two layer 3 VPN instances are VPN 30 and VPN 300 respectively. A global VN ID corresponding to VPN 30 is VN 30, and a global VN ID corresponding to VPN 300 is VN 300. VN 30 and VN 300 are used for communication between NVEs across VNs such that an NVE device receiving an NVO3 packet learns, according to the global VN IDs, that which layer 3 VPN instance is corresponding to the NVO3 packet. Besides, the NVE also needs to set a corresponding access VN ID for each VN, where each VN may belong to different layer 3 VPN instances, for example, VN 31, VN 32, VN 33, VN 310, VN 320, and VN 330 are all access VN IDs of VNs. VN 31, VN 32, and VN 33 belong to a layer 3 VPN instance with a layer 3 VPN instance identifier being VPN 30, and VN 310, VN 320, and VN 330 belong to a layer 3 VPN instance with a layer 3 VPN instance identifier being VPN 300. Because a TES in a network is directly connected to each VN, VN 31, VN 32, VN 323, VN 310, VN 320, and VN 330 are used by the NVE device to learn, when the NVE device receives a packet sent by a TES and acquires an access VN ID in the packet, that to which VN the TES is connected to, and learn, according to a correspondence between access VN IDs of VNs and layer 3 VPN instance identifiers, to which layer 3 VPN instance the TES belongs to. Therefore, it can be said that a table of a correspondence between layer 3 VPN instance identifiers and global VN IDs and a table of a correspondence between access VN IDs and layer 3 VPN instance identifiers are set on the NVE. The two correspondence tables may be presented in a same table shown in FIG. 3, or may be set separately.

FIG. 4 is a flowchart of Embodiment 1 of a method for forwarding a packet according to an embodiment of the present disclosure. As shown in FIG. 4, the method in this embodiment includes the following steps.

Step S401: A first NVE receives a first packet sent by a first TES, where a destination IP address of the first packet is an IP address of a second TES, a destination MAC address is a gateway MAC address corresponding to the first NVE, and the first TES and the second TES belong to a same layer 3 VPN.

Furthermore, in this embodiment, each NVE is used as a layer 3 gateway for a TES locally connected to the NVE, that is, for each Address Resolution Protocol (ARP) request packet that is sent by the local TES and arrives at the gateway, the NVE replies with an ARP reply packet, where a source MAC address in the ARP reply packet is a gateway MAC address corresponding to the NVE. Each layer 2 VN corresponds to one gateway interface, and multiple gateway interfaces may correspond to a same gateway MAC address.

In this embodiment, the first TES is locally connected to the first NVE, the second TES is locally connected to a second NVE, and the first TES and the second TES are located in different VNs of a same tenant, that is, the first TES and the second TES belong to a same layer 3 VPN but belong to different VNs in the layer 3 VPN. The first TES needs to send the first packet to the second TES. Therefore, after the first TES sends the first packet to the second TES, the first NVE locally connected to the first TES receives the first packet, where the destination IP address of the first packet is the IP address of the second TES, and the destination MAC address of the first packet is the gateway MAC address corresponding to the first NVE.

Step S402: The first NVE acquires an access VN ID of the first TES according to at least one of information about a port receiving the first packet and the first packet, and acquires, according to the access VN ID of the first TES, a layer 3 VPN instance identifier corresponding to the first TES.

Furthermore, a correspondence between access VN IDs of TESs and layer 3 VPN instance identifiers may be preconfigured in the table shown in FIG. 3. The first NVE generates a corresponding layer 3 VPN instance identifier for each local layer 3 VPN, where IP addresses in different layer 3 VPN instances may overlap, and routing and forwarding tables generated for different layer 3 VPN instances are segregated from each other. After receiving the first packet sent by the first TES, the first NVE acquires the access VN ID of the first TES according to at least one of information in the first packet and a port receiving the packet, obtains the corresponding layer 3 VPN instance identifier according to the access VN ID of the TES, and searches a corresponding routing and forwarding table according to the layer 3 VPN instance identifier.

Acquiring an access VN ID of the first TES according to at least one of information about a port receiving the first packet and the first packet may be acquiring the access VN ID of the first TES according to a correspondence between ports and VN IDs, may be acquiring the access VN ID of the first TES according to a VN ID carried in the first packet, may be acquiring the access VN ID of the first TES according to a virtual local area network identifier (VLAN ID) carried in the first packet and a correspondence between VLAN IDs and VN IDs, may be acquiring the access VN ID of the first TES according to a correspondence between MAC addresses and VN IDs, or may be acquiring the access VN ID of the first TES according to a correspondence between "port+VLAN" and VN IDs.

Step S403: The first NVE performs layer 2 termination on the first packet, searches, according to the IP address of the second TES, a routing and forwarding table corresponding to the layer 3 VPN instance identifier of the first TES, to obtain an entry corresponding to the IP address of the second TES, and encapsulates the first packet into an NVO3 packet according to the entry.

Furthermore, after the first NVE acquires the layer 3 VPN instance identifier of the first TES, because the first TES and the second TES are not located in a same VN, the first packet needs to be forwarded using layer 3 network. Therefore, layer 2 termination is first performed on the first packet, that is, data link layer termination is performed on the first packet, and the first packet continues to be forwarded using a network layer instead. Then a routing and forwarding table corresponding to the layer 3 VPN instance identifier of the first TES is searched according to the destination IP address of the first packet, that is, the IP address of the second TES, to acquire an IP address and a MAC address of the second NVE connected to the second TES and a global VN ID corresponding to the same layer 3 VPN on the second NVE, and then the first packet is encapsulated into an NVO3 packet, where a global VN ID in the NVO3 packet is the global VN ID corresponding to a layer 3 VPN instance identifier of the second TES, and a destination MAC address in the NVO3 packet is the MAC address of the second NVE.

Step S404: The first NVE forwards the NVO3 packet to a second NVE using a layer 3 network, where the second TES is connected to the second NVE.

Furthermore, the first NVE may forward the NVO3 packet to the second NVE using the layer 3 network, and after receiving the NVO3 packet, the second NVE decapsulates the NVO3 packet. Because the destination MAC address of the NVO3 packet is the MAC address of the second NVE, the second NVE determines that the NVO3 packet is a packet to be transmitted across VNs, and the second NVE performs layer 2 termination on the NVO3 packet, finds a corresponding layer 3 VPN instance identifier according to the global VN ID in the NVO3 packet, searches a routing and forwarding table corresponding to the layer 3 VPN instance identifier, and forwards a decapsulated packet to the second TES. The second TES is locally connected to the second NVE.

According to this embodiment, in an NVO3 network, each NVE is used as a gateway for a TES locally connected to the NVE, and when data is transmitted between TESs across VNs, NVEs locally connected to the TESs are separately used as gateways such that a packet to be transmitted between the TESs across the VNs does not need to be forwarded using a centralized layer 3 gateway, and can be directly transmitted between the NVEs locally connected to the TESs instead, thereby reducing detours of a data flow and improving efficiency of packet forwarding.

Figure 5:
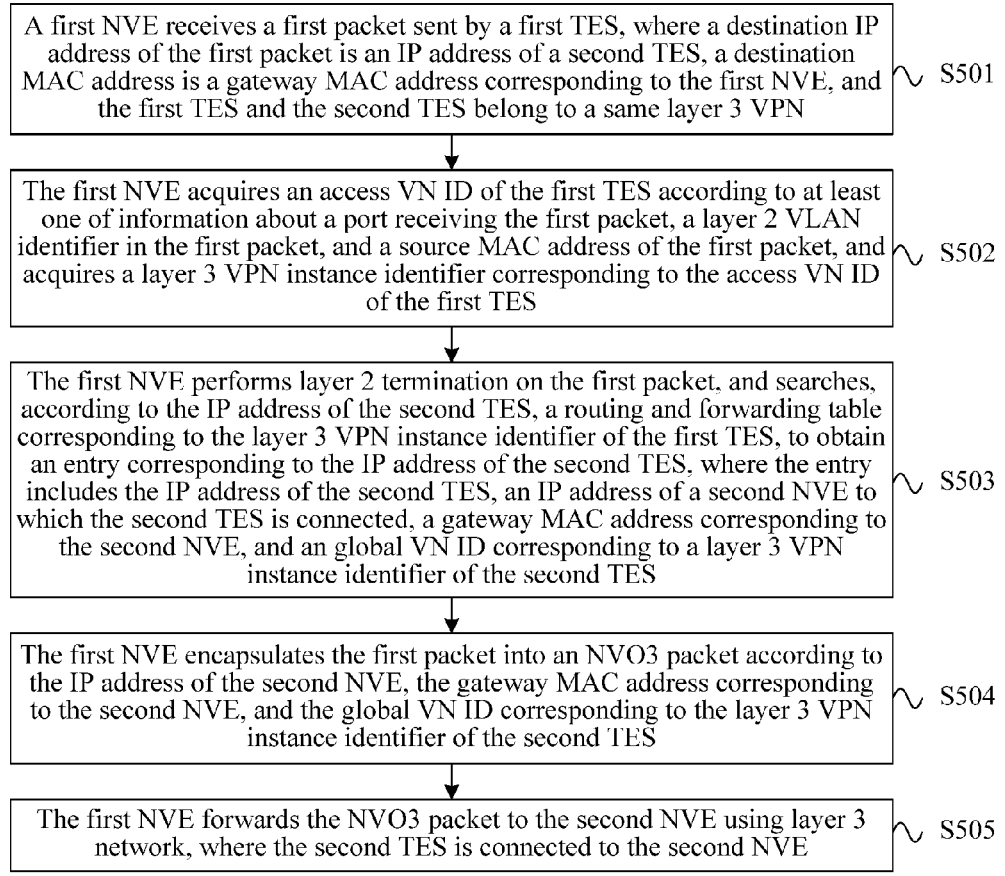
FIG. 5 is a flowchart of Embodiment 2 of a method for forwarding a packet according to an embodiment of the present disclosure.

FIG. 5 is a flowchart of Embodiment 2 of a method for forwarding a packet according to an embodiment of the present disclosure. As shown in FIG. 5, the method in this embodiment includes the following steps, Step S501: A first NVE receives a first packet sent by a first TES, where a destination IP address of the first packet is an IP address of a second TES, a destination MAC address is a gateway MAC address corresponding to the first NVE, and the first TES and the second TES belong to a same layer 3 VPN.

Step S502: The first NVE acquires an access VN ID of the first TES according to at least one of information about a port receiving the first packet, a layer 2 VLAN identifier in the first packet, and a source MAC address of the first packet, and acquires a layer 3 VPN instance identifier corresponding to the access VN ID of the first TES.

Furthermore, a correspondence between access VN IDs of TESs and layer 3 VPN instance identifiers may be preconfigured in the table shown in FIG. 3. An NVE generates a corresponding layer 3 VPN instance identifier for each local layer 3 VPN, where IP addresses in different layer 3 VPN instances may overlap, and routing and forwarding tables generated for different layer 3 VPN instances are segregated from each other, and searches a corresponding routing and forwarding table according to a layer 3 VPN instance identifier during packet forwarding. After receiving the packet sent by the TES, the NVE acquires a corresponding access VN ID according to at least one of information in the packet and information about an access port, for example, the access VN ID of the first TES may be acquired according to a correspondence between ports and VN IDs, the access VN ID of the first TES may be acquired according to a VN ID carried in the first packet, the access VN ID of the first TES may be acquired according to a VLAN ID carried in the first packet and a correspondence between VLAN IDs and VN IDs, the access VN ID of the first TES may be acquired according to a correspondence between MAC addresses and VN IDs, or the access VN ID of the first TES may be acquired according to a correspondence between "port+VLAN" and VN IDs.

Step S503: The first NVE performs layer 2 termination on the first packet, and searches, according to the IP address of the second TES, a routing and forwarding table corresponding to the layer 3 VPN instance identifier of the first TES, to obtain an entry corresponding to the IP address of the second TES, where the entry includes the IP address of the second TES, an IP address of a second NVE to which the second TES is connected, a gateway MAC address corresponding to the second NVE, and a global VN ID corresponding to a layer 3 VPN instance identifier of the second TES.

Furthermore, each NVE in a network announces, to another NVE, a host route directly connected to a TES in each local tenant (each VPN instance) and a route introduced from an exterior routing protocol. Each NVE announces a layer 3 gateway MAC address corresponding to each VPN instance, an NVE source IP address, and an ingress NVE to another NVE. During layer 3 packet forwarding, an inner destination MAC address is a MAC address which is announced by an egress NVE, of a layer 3 gateway.

The first NVE also has routing information, which is announced by another NVE in the network, of the other NVE in the network. Therefore, after receiving the first packet, the first NVE may search a routing and forwarding table corresponding to the layer 3 VPN instance identifier of the first TES, to find routing information corresponding to the destination IP address in the first packet (that is, the IP address of the second TES). The routing and forwarding table corresponding to the layer 3 VPN instance identifier of the first TES includes an IP address of a destination TES, an IP address of an NVE to which the destination TES is connected, a gateway MAC address corresponding to the NVE to which the destination TES is connected, and a global VN ID corresponding to a layer 3 VPN instance identifier of the destination TES. Therefore, the first NVE can acquire the IP address of the second NVE connected to the second TES, the gateway MAC address corresponding to the second NVE, and the global VN ID corresponding to the layer 3 VPN instance identifier of the second TES.

Step S504: The first NVE encapsulates the first packet into an NVO3 packet according to the IP address of the second NVE, the gateway MAC address corresponding to the second NVE, and the global VN ID corresponding to the layer 3 VPN instance identifier of the second TES.

Further, the first NVE can learn a sending destination of the first packet according to the IP address of the second NVE and the gateway MAC address corresponding to the second NVE. When encapsulating the first packet into an NVO3 packet, the first NVE first replaces the destination MAC address of the first packet with the gateway MAC address corresponding to the second NVE and replaces the source MAC address of the first packet with the gateway MAC address corresponding to the first NVE, and then encapsulates an NVO3 tunnel header using the IP address of the second NVE as a destination IP address of the NVO3 packet, an IP address of the first NVE as a source IP address of the NVO3 packet, and the global VN ID corresponding to the layer 3 VPN instance identifier of the second TES as a global VN ID of the NVO3 packet, to generate the NVO3 packet.

Step S505: The first NVE forwards the NVO3 packet to the second NVE using layer 3 network, where the second TES is connected to the second NVE.

Figure 6:
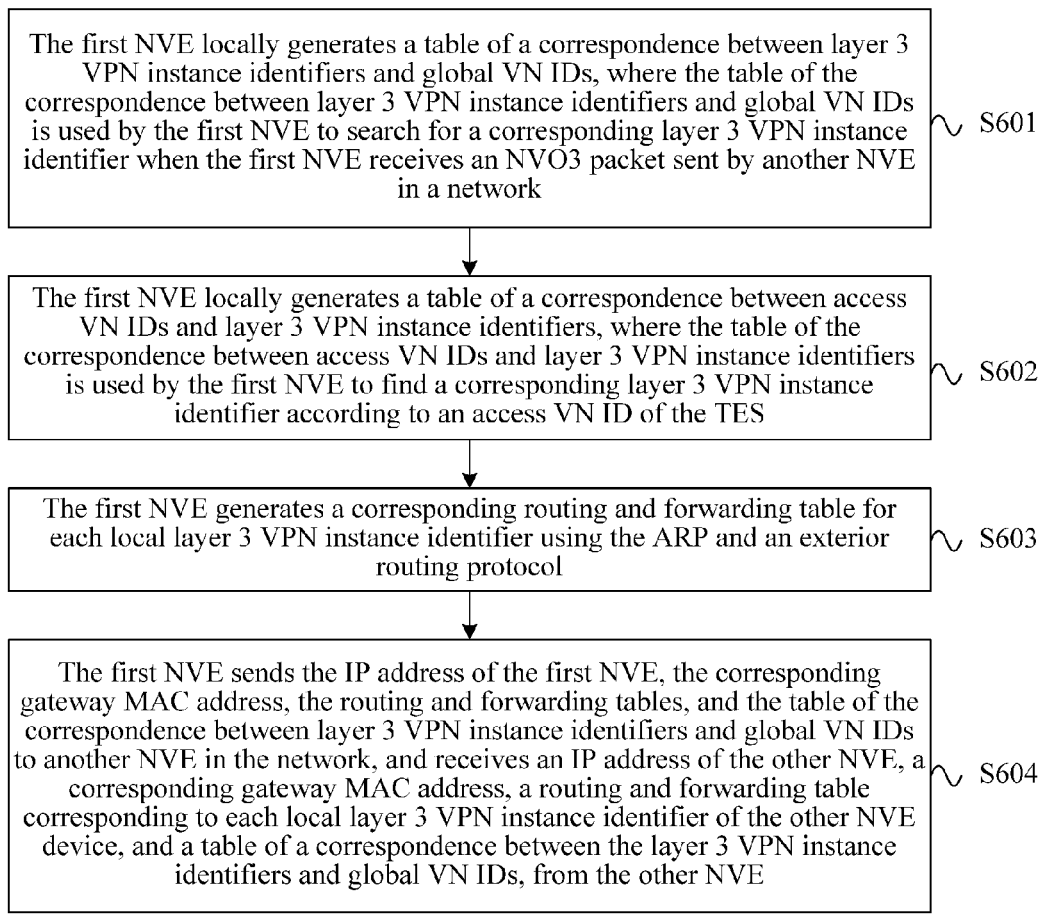
FIG. 6 is a flowchart of preprocessing before Embodiment 1 or 2 of a method for forwarding a packet according to an embodiment of the present disclosure.

FIG. 6 is a flowchart of preprocessing before Embodiment 1 or 2 of a method for forwarding a packet according to an embodiment of the present disclosure. Because an NVE needs to use local routing information and routing information of another NVE in a network to implement the methods for forwarding a packet in the embodiments shown in FIG. 4 and FIG. 5, the preprocessing in this embodiment may be performed before the embodiments shown in FIG. 4 and FIG. 5. As shown in FIG. 6, the preprocessing in this embodiment includes the following steps.

Step S601: The first NVE locally generates a table of a correspondence between layer 3 VPN instance identifiers and global VN IDs, where the table of the correspondence between layer 3 VPN instance identifiers and global VN IDs is used by the first NVE to search for a corresponding layer 3 VPN instance identifier when the first NVE receives an NVO3 packet sent by another NVE in a network.

Furthermore, an NVE may locally have multiple layer 3 VPN instances, and therefore, the NVE needs to set a corresponding global VN ID for each local layer 3 VPN instance identifier, that is, locally generate a table of a correspondence between layer 3 VPN instance identifiers and global VN IDs. Because global VN IDs corresponding to layer 3 VPN instance identifiers that belong to a same VPN in different NVEs are the same, a global VN ID is added to an encapsulated NVO3 packet when an NVO3 packet is forwarded across VNs. Therefore, the first NVE can find the corresponding layer 3 VPN instance identifier according to the table of the correspondence between layer 3 VPN instance identifiers and global VN IDs when the first NVE receives the NVO3 packet sent by another NVE in a network.

Step S602: The first NVE locally generates a table of a correspondence between access VN IDs and layer 3 VPN instance identifiers, where the table of the correspondence between access VN IDs and layer 3 VPN instance identifiers is used by the first NVE to find a corresponding layer 3 VPN instance identifier according to an access VN ID of the TES.

Furthermore, an NVE may locally have multiple layer 3 VPN instances, where each layer 3 VPN instance may include multiple VNs, and therefore, the NVE needs to set a corresponding layer 3 VPN instance identifier for an access VN ID of each local VN, that is, locally generate a table of a correspondence between access VN IDs and layer 3 VPN instance identifiers. In this way, when receiving a packet sent by the TES locally connected to the first NVE, the first NVE can acquire an access VN ID in the packet according to information about the packet or information about a port receiving the packet, and find the corresponding layer 3 VPN instance identifier according to the table of the correspondence between access VN IDs and layer 3 VPN instance identifiers.

Step S603: The first NVE generates a corresponding routing and forwarding table for each local layer 3 VPN instance identifier using the ARP and an exterior routing protocol.

Furthermore, because the first TES and the first NVE may be directly connected to each other or may be connected to each other using an exterior routing protocol, in order that all TESs connected to the first NVE can perform packet transmission using the method for forwarding a packet provided in the embodiments of the present disclosure, the first NVE needs to acquire routing information of all TESs that are locally directly connected to the first NVE or are connected to the first NVE using an exterior routing protocol. The first NVE acquires, using the ARP, routing information of a TES locally connected to the first NVE, and acquires, using an exterior routing protocol, routing information of a TES connected to the first NVE using an exterior routing protocol. The first NVE generates the corresponding routing and forwarding table for each local layer 3 VPN instance identifier according to acquired routing information of all the TESs.

An implementation sequence of steps S601, S602, and S603 in the present disclosure is not limited to the example in the foregoing embodiment.

Step S604: The first NVE sends the IP address of the first NVE, the corresponding gateway MAC address, the routing and forwarding tables, and the table of the correspondence between layer 3 VPN instance identifiers and global VN IDs to another NVE in the network, and receives an IP address of the other NVE, a corresponding gateway MAC address, a routing and forwarding table corresponding to each local layer 3 VPN instance identifier of the other NVE device, and a table of a correspondence between the layer 3 VPN instance identifiers and global VN IDs, from the other NVE.

Further, in order that a packet can be forwarded between NVEs, the first NVE needs to send the IP address of the first NVE, the gateway MAC address corresponding to the first NVE, the acquired routing and forwarding table corresponding to each local layer 3 VPN instance identifier of the first NVE in step S603, and the generated table of the correspondence between layer 3 VPN instance identifiers and global VN IDs in step S601 to another NVE in the network. Besides, the first NVE also needs to receive the foregoing information sent by the other NVE in the network. In this way, each NVE in the network generates routing and forwarding information including a correspondence between IP addresses of NVEs, gateway MAC addresses corresponding to the NVEs, a routing and forwarding table corresponding to each local layer 3 VPN instance identifier of the NVEs, and tables of correspondences between each local layer 3 VPN instance of the NVEs and global VN IDs.

Further, NVEs may send routing information to each other using the Border Gateway Protocol (BGP). On each NVE, a BGP route distinguisher (RD) is configured for each tenant to be used as a layer 3 VPN identifier used on a control plane of an entire BGP network. Each NVE announces an RD, a layer 3 tenant identifier, a MAC address of the NVE, and a source IP address of the NVE. Centralized management of information announcement between NVEs may also be performed in a manner of software-defined networking (SDN). An SDN controller has information about all NVEs, and information synchronization between the NVEs is performed using the controller.

FIG. 4, FIG. 5, and FIG. 6 show procedures of the methods in which an NVE is used as a gateway device on a transmit end, and the following describes a provided method for forwarding a packet using an example in which an NVE is used as a gateway device on a receive end.

Figure 7:
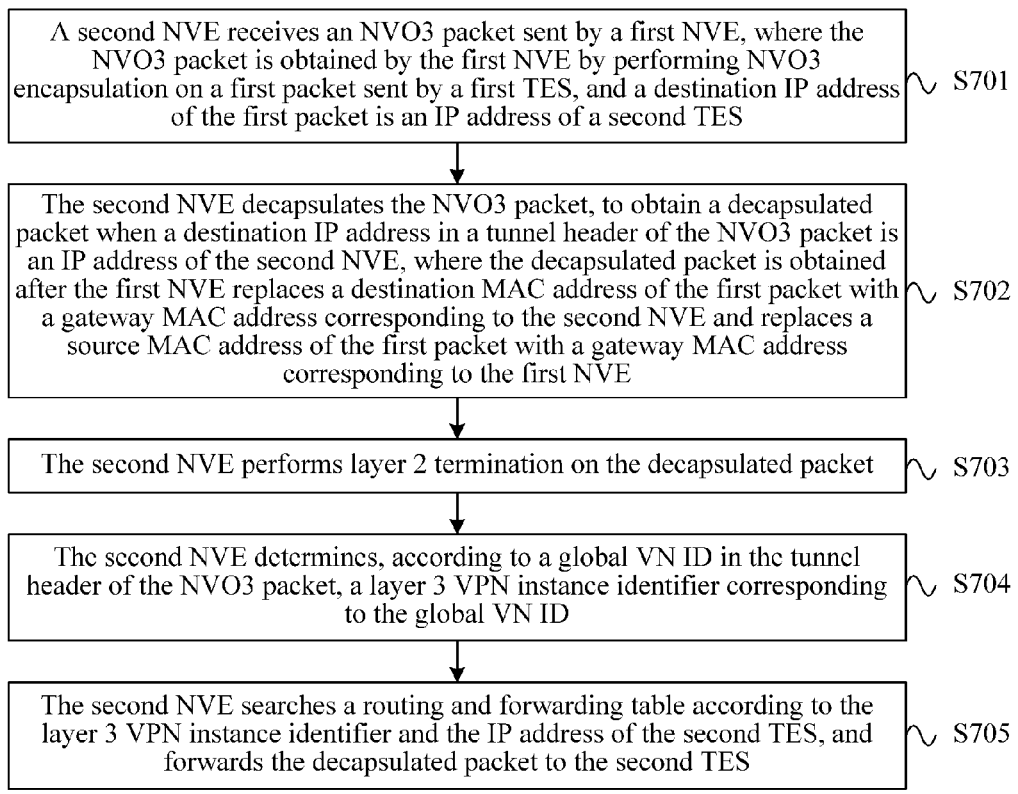
FIG. 7 is a flowchart of Embodiment 3 of a method for forwarding a packet according to an embodiment of the present disclosure.

FIG. 7 is a flowchart of Embodiment 3 of a method for forwarding a packet according to an embodiment of the present disclosure. As shown in FIG. 7, the method in this embodiment includes the following steps.

Step S701: A second NVE receives an NVO3 packet sent by a first NVE, where the NVO3 packet is obtained by the first NVE by performing NVO3 encapsulation on a first packet sent by a first TES, and a destination IP address of the first packet is an IP address of a second TES.

The first NVE first receives the first packet sent by the first TES when the first TES connected to the first NVE needs to send the first packet to the second TES connected to the second NVE, after determining that the destination IP address in the first packet is the IP address of the second TES, the first NVE encapsulates the first packet into the NVO3 packet, and sends the NVO3 packet to the second NVE, and the second NVE receives the NVO3 packet that is sent by the first NVE after the first NVE encapsulates the first packet.

Step S702: The second NVE decapsulates the NVO3 packet, to obtain a decapsulated packet when a destination IP address in a tunnel header of the NVO3 packet is an IP address of the second NVE, where the decapsulated packet is obtained after the first NVE replaces a destination MAC address of the first packet with a gateway MAC address corresponding to the second NVE and replaces a source MAC address of the first packet with a gateway MAC address corresponding to the first NVE.

Further, after receiving the NVO3 packet, the second NVE first determines whether the destination IP address in the tunnel header of the NVO3 packet is the IP address of the second NVE, and decapsulates the NVO3 packet if the destination IP address in the tunnel header of the NVO3 packet is the IP address of the second NVE, thereby acquiring the decapsulated packet. In order to forward the NVO3 packet to the second TES using the second NVE, the first NVE first replaces the destination MAC address of the first packet with the gateway MAC address corresponding to the second NVE and replaces the source MAC address of the first packet with the gateway MAC address corresponding to the first NVE. Therefore, the foregoing differences exist between the packet obtained by the second NVE after decapsulation and the original first packet sent by the first TES.

Step S703: The second NVE performs layer 2 termination on the decapsulated packet.

Furthermore, the second NVE determines whether the destination MAC address in the first packet is the gateway MAC address corresponding to the second NVE after acquiring the decapsulated packet. As can be known according to the procedure for forwarding a layer 2 packet in an NVO3 network shown in FIG. 2, if TESs transmitting data belong to a same VN, a destination MAC address in the packet acquired by an NVE that receives and decapsulates an NVO3 packet is an address of a destination TES, the NVE can directly send the packet to the destination TES using layer 2. In this embodiment, the second NVE performs layer 2 termination on the decapsulated packet if the second NVE determines that the destination MAC address is the gateway MAC address corresponding to the second NVE after acquiring the decapsulated packet. In this way, the second NVE can forward the decapsulated packet to the second TES using routing information and using a forwarding method based on an IP manner.

It should be noted that a TES and an NVE may be locally directly connected to each other, or may be connected to each other using an exterior routing protocol. In the prior-art NVO3 network, if a packet is transmitted between TESs across VNs, after an NVE receiving an NVO3 packet decapsulates the NVO3 packet, the NVE can search, only according to VN routing information in encapsulated data, a MAC forwarding table corresponding to a VN, and forward the packet to a corresponding TES. However, the NVE cannot forward the decapsulated NVO3 packet when the TES and the NVE are connected to each other using an IP network. In this embodiment, the second NVE performs layer 2 termination on the decapsulated packet, and forwards the decapsulated packet to the destination TES according to routing information and using a path based on an IP routing manner, which is applicable to any connection manner of the TES and the NVE when the second NVE determines that the destination MAC address in the packet is the gateway MAC address corresponding to the second NVE after receiving and decapsulating the NVO3 packet.

Step S704: The second NVE determines, according to a global VN ID in the tunnel header of the NVO3 packet, a layer 3 VPN instance identifier corresponding to the global VN ID.

The second NVE may acquire, from the tunnel header of the NVO3 packet, a global VN ID carried in the tunnel header when decapsulating the NVO3 packet. The global VN ID is added when the first NVE sending the NVO3 packet encapsulates the NVO3 packet, and the global VN ID is a global VN ID corresponding to an identifier of a layer 3 VPN instance in which the destination TES is located. The second NVE can determine, according to the global VN ID in the tunnel header of the NVO3 packet, the layer 3 VPN instance identifier corresponding to the global VN ID.

Step S705: The second NVE searches a routing and forwarding table according to the layer 3 VPN instance identifier and the IP address of the second TES, and forwards the decapsulated packet to the second TES.

Furthermore, the second NVE may search the routing and forwarding table corresponding to the layer 3 VPN instance identifier, and can forward the decapsulated packet to the second TES according to the destination IP address in the decapsulated packet after acquiring the layer 3 VPN instance identifier. Because routing information is saved in the second NVE and the destination IP address in the decapsulated packet is the IP address of the second TES, and in step S703, the second NVE performs layer 2 termination on the first packet, the second NVE can forward the decapsulated packet to the second TES using the routing information.

According to this embodiment, in an NVO3 network, each NVE is used as a gateway for a TES locally connected to the NVE, and NVEs locally connected to the TESs are separately used as gateways such that a packet to be transmitted between the TESs across the VNs does not need to be forwarded using a centralized layer 3 gateway when data is transmitted between TESs across VNs, and can be directly transmitted between the NVEs locally connected to the TESs, thereby reducing detours of a data flow and improving efficiency of packet forwarding.

Figure 8:
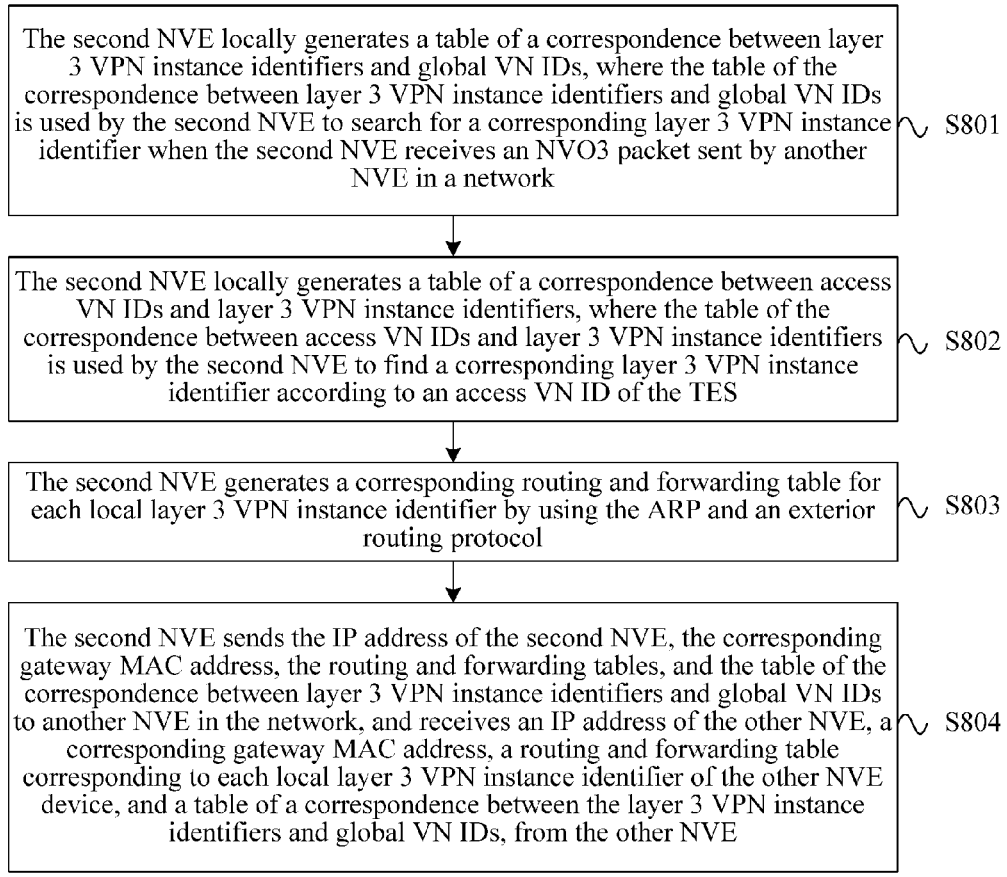
FIG. 8 is a flowchart of preprocessing before Embodiment 3 of a method for forwarding a packet according to an embodiment of the present disclosure.

FIG. 8 is a flowchart of preprocessing before Embodiment 3 of a method for forwarding a packet according to an embodiment of the present disclosure. Because an NVE needs to use local routing information and routing information of another NVE in a network to implement the method for forwarding a packet in the embodiment shown in FIG. 7, the preprocessing in this embodiment may be performed before the embodiment shown in FIG. 7. As shown in FIG. 8, the preprocessing in this embodiment includes the following steps.

Step S801: The second NVE locally generates a table of a correspondence between layer 3 VPN instance identifiers and global VN IDs, where the table of the correspondence between layer 3 VPN instance identifiers and global VN IDs is used by the second NVE to search for a corresponding layer 3 VPN instance identifier when the second NVE receives an NVO3 packet sent by another NVE in a network.

Furthermore, an NVE may locally have multiple layer 3 VPN instances, and therefore, the NVE needs to set a corresponding global VN ID for each local layer 3 VPN instance identifier, that is, locally generate a table of a correspondence between layer 3 VPN instance identifiers and global VN IDs. Because global VN IDs corresponding to layer 3 VPN instance identifiers that belong to a same VPN in different NVEs are the same, a global VN ID is added to an encapsulated NVO3 packet when an NVO3 packet is forwarded across VNs. Therefore, the second NVE can find the corresponding layer 3 VPN instance identifier according to the table of the correspondence between layer 3 VPN instance identifiers and global VN IDs when the second NVE receives the NVO3 packet sent by another NVE in a network.

Step S802: The second NVE locally generates a table of a correspondence between access VN IDs and layer 3 VPN instance identifiers, where the table of the correspondence between access VN IDs and layer 3 VPN instance identifiers is used by the second NVE to find a corresponding layer 3 VPN instance identifier according to an access VN ID of the TES.

Further, an NVE may locally have multiple layer 3 VPN instances, where each layer 3 VPN instance may include multiple VNs, and therefore, the NVE needs to set a corresponding layer 3 VPN instance identifier for an access VN ID of each local VN, that is, locally generate a table of a correspondence between access VN IDs and layer 3 VPN instance identifiers. In this way, when receiving a packet sent by the TES locally connected to the second NVE, the second NVE can acquire an access VN ID in the packet according to information about the packet or information about a port receiving the packet, and find the corresponding layer 3 VPN instance identifier according to the table of the correspondence between access VN IDs and layer 3 VPN instance identifiers.

Step S803: The second NVE generates a corresponding routing and forwarding table for each local layer 3 VPN instance identifier using the ARP and an exterior routing protocol.

Furthermore, because the second TES and the second NVE may be directly connected to each other or may be connected to each other using an exterior routing protocol, in order that all TESs connected to the second NVE can perform packet transmission using the method for forwarding a packet provided in the embodiments of the present disclosure, the second NVE needs to acquire routing information of all TESs that are locally directly connected to the second NVE or are connected to the second NVE using an exterior routing protocol. The second NVE acquires, using the ARP, routing information of a TES locally connected to the second NVE, and acquires, using an exterior routing protocol, routing information of a TES connected to the second NVE using an exterior routing protocol. The second NVE generates the corresponding routing and forwarding table for each local layer 3 VPN instance identifier according to the acquired routing information of all the TESs.

An implementation sequence of steps S801, S802, and S803 in the present disclosure is not limited to the example in the foregoing embodiment.

Step S804: The second NVE sends the IP address of the second NVE, the corresponding gateway MAC address, the routing and forwarding tables, and the table of the correspondence between layer 3 VPN instance identifiers and global VN IDs to another NVE in the network, and receives an IP address of the other NVE, a corresponding gateway MAC address, a routing and forwarding table corresponding to each local layer 3 VPN instance identifier of the other NVE device, and a table of a correspondence between the layer 3 VPN instance identifiers and global VN IDs, from the other NVE.

Furthermore, in order that a packet can be forwarded between NVEs, the second NVE needs to send the IP address of the second NVE, the gateway MAC address corresponding to the second NVE, the acquired routing and forwarding table corresponding to each local layer 3 VPN instance identifier of the second NVE in step S803, and the generated table of the correspondence between layer 3 VPN instance identifiers and global VN IDs in step S801 to other NVEs in the network. Besides, the second NVE also needs to receive the foregoing information sent by the other NVEs in the network. In this way, each NVE in the network generates routing and forwarding information including a correspondence between IP addresses of NVEs, gateway MAC addresses corresponding to the NVEs, a routing and forwarding table corresponding to each local layer 3 VPN instance identifier of the NVEs, and tables of correspondences between each local layer 3 VPN instance of the NVEs and global VN IDs.

Further, NVEs may send routing information to each other using the BGP. On each NVE, a BGP RD is configured for each tenant to be used as a layer 3 VPN identifier used on a control plane of an entire BGP network. Each NVE announces an RD, a layer 3 tenant identifier, a MAC address of the NVE, and a source IP address of the NVE. Centralized management of information announcement between NVEs may also be performed in a manner of SDN. An SDN controller has information about all NVEs, and information synchronization between the NVEs is performed using the controller.

Figure 9:
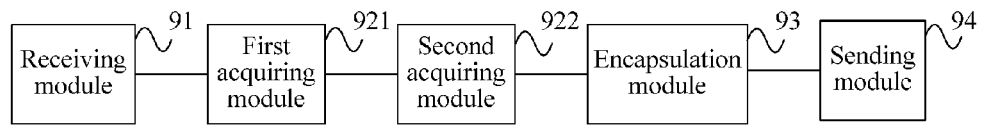
FIG. 9 is a schematic structural diagram of Embodiment 1 of an apparatus for forwarding a packet according to an embodiment of the present disclosure.

FIG. 9 is a schematic structural diagram of Embodiment 1 of an apparatus for forwarding a packet according to an embodiment of the present disclosure. As shown in FIG. 9, the apparatus for forwarding a packet in this embodiment may be an NVE, and the apparatus includes a receiving module 91 configured to receive a first packet sent by a first TES, where a destination IP address of the first packet is an IP address of a second TES, a destination MAC address of the first packet is a gateway MAC address corresponding to the NVE, and the first TES and the second TES belong to a same layer 3 VPN. The apparatus further includes a first acquiring module 921 configured to acquire an access VN ID of the first TES according to at least one of information about a port receiving the first packet and the first packet, a second acquiring module 922 configured to acquire a layer 3 VPN instance identifier of the first TES according to the access VN ID of the first TES, an encapsulation module 93 configured to perform layer 2 termination on the first packet, search, according to the IP address of the second TES, a routing and forwarding table corresponding to the layer 3 VPN instance identifier of the first TES, to obtain an entry corresponding to the IP address of the second TES, and encapsulate the first packet into an NVO3 packet according to the entry, and a sending module 94 configured to forward the NVO3 packet to a second NVE using layer 3 network, where the second TES is connected to the second NVE.

The apparatus for forwarding a packet in this embodiment is configured to implement the technical method in the method embodiment shown in FIG. 4. The implementation principle and technical effects are similar, and are not described in detail herein.

In the embodiment shown in FIG. 9, the encapsulation module 93 is further configured to perform layer 2 termination on the first packet, and search, according to the IP address of the second TES, the routing and forwarding table corresponding to the layer 3 VPN instance identifier of the first TES, to obtain the entry corresponding to the IP address of the second TES, where the entry includes the IP address of the second TES, an IP address of the second NVE to which the second TES is connected, a gateway MAC address corresponding to the second NVE, and a global VN ID corresponding to a layer 3 VPN instance identifier of the second TES, and encapsulate the first packet into the NVO3 packet according to the IP address of the second NVE, the gateway MAC address corresponding to the second NVE, and the global VN ID corresponding to the layer 3 VPN instance identifier of the second TES.

In the embodiment shown in FIG. 9, the first acquiring module 921 is further configured to acquire the access VN ID of the first TES according to at least one of the information about the port receiving the first packet, a layer 2 VLAN identifier in the first packet, and a source MAC address of the first packet.

In the embodiment shown in FIG. 9, the encapsulation module 93 is further configured to replace the destination MAC address of the first packet with the gateway MAC address corresponding to the second NVE, and replace the source MAC address of the first packet with the gateway MAC address corresponding to the NVE, to obtain a first packet after replacement, and encapsulate an NVO3 header for the first packet after replacement, to generate the NVO3 packet, where a destination IP address in the NVO3 header is the IP address of the second NVE, a source IP address is an IP address of the NVE, and a VN ID in the NVO3 header is the global VN ID corresponding to the layer 3 VPN instance identifier of the second TES.

Figure 10:
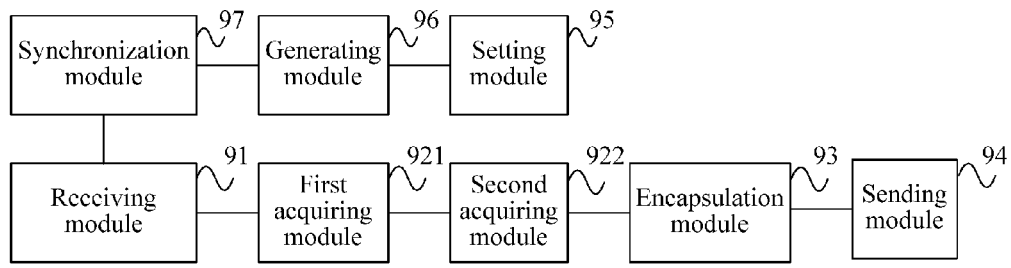
FIG. 10 is a schematic structural diagram of Embodiment 2 of an apparatus for forwarding a packet according to an embodiment of the present disclosure.

FIG. 10 is a schematic structural diagram of Embodiment 2 of an apparatus for forwarding a packet according to an embodiment of the present disclosure. As shown in FIG. 10, based on FIG. 9, the apparatus for forwarding a packet in this embodiment further includes a setting module 95 configured to locally generate a table of a correspondence between access VN IDs and layer 3 VPN instance identifiers, and in this case, the second acquiring module 922 is further configured to search the table of the correspondence between access VN IDs and layer 3 VPN instance identifiers according to the access VN ID of the first TES, to obtain the layer 3 VPN instance identifier of the first TES.

In another embodiment of the present disclosure, the apparatus further includes a generating module 96 and a synchronization module 97. The setting module 95 is further configured to locally generate a table of a correspondence between layer 3 VPN instance identifiers and global VN IDs, where the table of the correspondence between layer 3 VPN instance identifiers and global VN IDs is used by the NVE to search for a corresponding layer 3 VPN instance identifier when the NVE receives an NVO3 packet sent by another NVE in a network. The generating module 96 is configured to generate a corresponding routing and forwarding table for each local layer 3 VPN instance identifier using the ARP and an exterior routing protocol. The synchronization module 97 is configured to send the IP address of the NVE, the corresponding gateway MAC address, the routing and forwarding tables, and the table of the correspondence between layer 3 VPN instance identifiers and global VN IDs to another NVE in the network, and receive an IP address of the other NVE, a corresponding gateway MAC address, a routing and forwarding table corresponding to each local layer 3 VPN instance identifier of the other NVE device, and a table of a correspondence between the layer 3 VPN instance identifiers and global VN IDs, from the other NVE.

The apparatus for forwarding a packet in this embodiment may also implement the preprocessing in the method embodiment shown in FIG. 6. The implementation principle and technical effects are similar, and are not described in detail herein.

In the embodiment shown in FIG. 10, the synchronization module 97 is further configured to send the IP address of the NVE, the gateway MAC address corresponding to the NVE, a routing and forwarding table of each local layer 3 VPN instance of the NVE, and a VN ID corresponding to each local layer 3 VPN instance of the NVE to another NVE in the network using the BGP, and receive an IP address of the other NVE, a gateway MAC address corresponding to the other NVE, a routing and forwarding table of each local layer 3 VPN instance of the other NVE, and a VN ID corresponding to each local layer 3 VPN instance of the other NVE from the other NVE in the network, or send the IP address of the NVE, the gateway MAC address corresponding to the NVE, a routing and forwarding table of each local layer 3 VPN instance of the NVE, and a VN ID corresponding to each local layer 3 VPN instance of the NVE to an SDN controller in the network such that the SDN controller sends the IP address of the NVE, the gateway MAC address corresponding to the NVE, the routing and forwarding table of each local layer 3 VPN instance of the NVE, and the VN ID corresponding to each local layer 3 VPN instance of the NVE to another NVE in the network, and receive an IP address of the other NVE, a gateway MAC address corresponding to the other NVE, a routing and forwarding table of each local layer 3 VPN instance of the other NVE, and a VN ID corresponding to each local layer 3 VPN instance of the other NVE that are sent by the other NVE in the network and delivered by the SDN controller.

Figure 11:
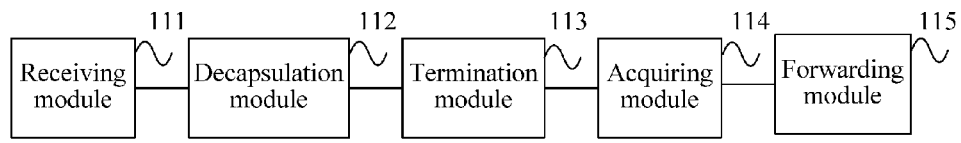
FIG. 11 is a schematic structural diagram of Embodiment 3 of an apparatus for forwarding a packet according to an embodiment of the present disclosure.

FIG. 11 is a schematic structural diagram of Embodiment 3 of an apparatus for forwarding a packet according to an embodiment of the present disclosure. As shown in FIG. 11, the apparatus is an NVE and includes a receiving module 111 configured to receive an NVO3 packet sent by another NVE, where the NVO3 packet is obtained by the other NVE by performing NVO3 encapsulation on a first packet sent by a first TES, and a destination IP address of the first packet is an IP address of a second TES, a decapsulation module 112 configured to decapsulate the NVO3 packet, to obtain a decapsulated packet when a destination IP address in a tunnel header of the NVO3 packet is an IP address of the NVE, where the decapsulated packet is obtained after the other NVE replaces a destination MAC address of the first packet with a gateway MAC address corresponding to the NVE and replaces a source MAC address of the first packet with a gateway MAC address corresponding to the other NVE, a termination module 113 configured to perform layer 2 termination on the decapsulated packet, an acquiring module 114 configured to acquire, according to a global VN ID in the tunnel header of the NVO3 packet, a layer 3 VPN instance identifier corresponding to the global VN ID, and a forwarding module 115 configured to search a routing and forwarding table according to the layer 3 VPN instance identifier and the IP address of the second TES, and forward the decapsulated packet to the second TES.

The apparatus for forwarding a packet in this embodiment is configured to implement the technical method in the method embodiment shown in FIG. 7. The implementation principle and technical effects are similar, and are not described in detail herein.

Figure 12:
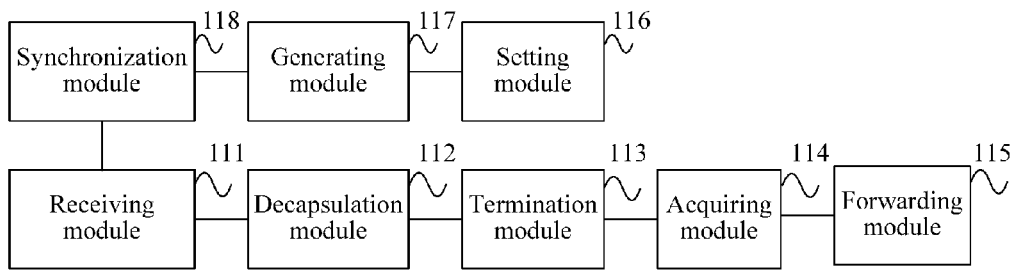
FIG. 12 is a schematic structural diagram of Embodiment 4 of an apparatus for forwarding a packet according to an embodiment of the present disclosure.

FIG. 12 is a schematic structural diagram of Embodiment 4 of an apparatus for forwarding a packet according to an embodiment of the present disclosure. As shown in FIG. 12, based on FIG. 11, the apparatus for forwarding a packet in this embodiment further includes a setting module 116 configured to locally generate a table of a correspondence between layer 3 VPN instance identifiers and global VN IDs, and the acquiring module 114 is further configured to search the table of the correspondence between layer 3 VPN instance identifiers and global VN IDs according to the global VN ID, to obtain the layer 3 VPN instance identifier corresponding to the global VN ID.

Besides, the apparatus further includes a generating module 117 and a synchronization module 118.

The setting module 116 is further configured to locally generate a table of a correspondence between access VN IDs and layer 3 VPN instance identifiers, where the table of the correspondence between access VN IDs and layer 3 VPN instance identifiers is used by the NVE to find a corresponding layer 3 VPN instance identifier according to an access VN ID of the TES.

The generating module 117 is configured to generate a corresponding routing and forwarding table for each local layer 3 VPN instance identifier using the ARP and an exterior routing protocol.

The synchronization module 118 is configured to send the IP address of the NVE, the corresponding gateway MAC address, the routing and forwarding tables, and the table of the correspondence between layer 3 VPN instance identifiers and global VN IDs to another NVE in a network, and receive an IP address of the other NVE, a corresponding gateway MAC address, a routing and forwarding table corresponding to each local layer 3 VPN instance identifier of the other NVE device, and a table of a correspondence between the layer 3 VPN instances and global VN IDs, from the other NVE in the network.

The apparatus for forwarding a packet in this embodiment is configured to implement the preprocessing in the method embodiment shown in FIG. 8. The implementation principle and technical effects are similar, and are not described in detail herein.

Further, in the embodiment shown in FIG. 12, the synchronization module 118 is further configured to send the IP address of the NVE, the gateway MAC address corresponding to the NVE, a routing and forwarding table of each local layer 3 VPN instance of the NVE, and a VN ID corresponding to each local layer 3 VPN instance of the NVE to another NVE in the network using the BGP, and receive an IP address of the other NVE, a gateway MAC address corresponding to the other NVE, a routing and forwarding table of each local layer 3 VPN instance of the other NVE, and a VN ID corresponding to each local layer 3 VPN instance of the other NVE from the other NVE in the network, or send the IP address of the NVE, the gateway MAC address corresponding to the NVE, a routing and forwarding table of each local layer 3 VPN instance of the NVE, and a VN ID corresponding to each local layer 3 VPN instance of the NVE to an SDN controller in the network such that the SDN controller sends the IP address of the NVE, the gateway MAC address corresponding to the NVE, the routing and forwarding table of each local layer 3 VPN instance of the NVE, and the VN ID corresponding to each local layer 3 VPN instance of the NVE to another NVE in the network, and receive an IP address of the other NVE, a gateway MAC address corresponding to the other NVE, a routing and forwarding table of each local layer 3 VPN instance of the other NVE, and a VN ID corresponding to each local layer 3 VPN instance of the other NVE that are sent by the other NVE in the network and delivered by the SDN controller.

Figure 13:
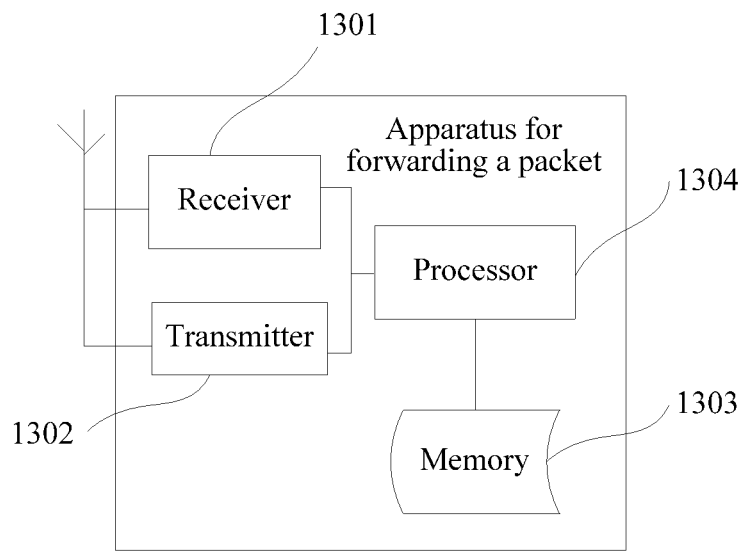
FIG. 13 is a schematic structural diagram of Embodiment 5 of an apparatus for forwarding a packet according to an embodiment of the present disclosure.

FIG. 13 is a schematic structural diagram of Embodiment 5 of an apparatus for forwarding a packet according to an embodiment of the present disclosure. As shown in FIG. 13, the apparatus for forwarding a packet includes a transmitter 1302, a receiver 1301, a memory 1303, and a processor 1304 connected to the transmitter 1302, the receiver 1301, and the memory 1303. Certainly, the apparatus for forwarding a packet may further include some universal components such as an input/output apparatus (not shown), which is not limited herein in this embodiment of the present disclosure.

The receiver 1301 is configured to receive a first packet sent by a first tenant end system TES, where a destination IP address of the first packet is an IP address of a second TES, a destination MAC address of the first packet is a gateway MAC address corresponding to the apparatus, and the first TES and the second TES belong to a same layer 3 VPN.

The memory 1303 is configured to store program code, and the processor 1304 is configured to invoke the program code stored in the memory 1303, to execute the following operations: acquire an access VN ID of the first TES according to at least one of information about a port receiving the first packet and the first packet, and acquire a layer 3 VPN instance identifier of the first TES according to the access VN ID of the first TES, perform layer 2 termination on the first packet, search, according to the IP address of the second TES, a routing and forwarding table corresponding to the layer 3 VPN instance identifier of the first TES, to obtain an entry corresponding to the IP address of the second TES, and encapsulate the first packet into an NVO3 packet according to the entry, and send the NVO3 packet to the transmitter 1302.

The transmitter 1302 is configured to forward the NVO3 packet to a second NVE using a layer 3 network, where the second TES is connected to the second NVE.

Figure 14:
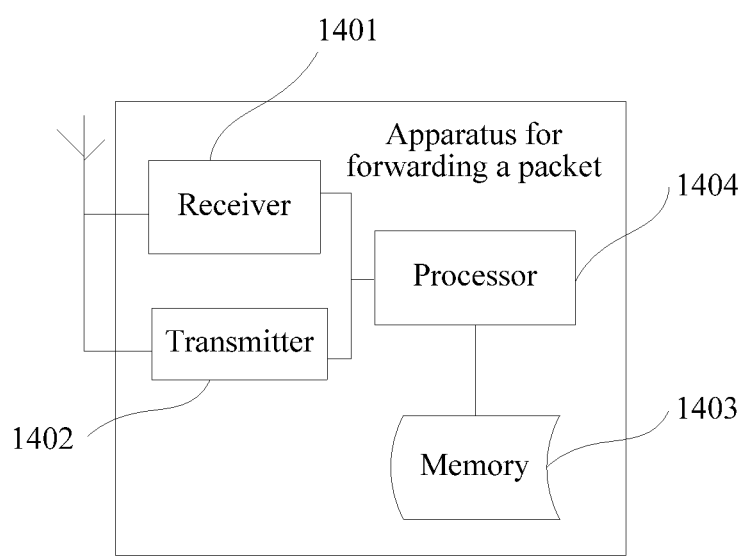
FIG. 14 is a schematic structural diagram of Embodiment 6 of an apparatus for forwarding a packet according to an embodiment of the present disclosure.

FIG. 14 is a schematic structural diagram of Embodiment 6 of an apparatus for forwarding a packet according to an embodiment of the present disclosure. As shown in FIG. 14, the apparatus for forwarding a packet includes a transmitter 1402, a receiver 1401, a memory 1403, and a processor 1404 connected to the transmitter 1402, the receiver 1401, and the memory 1403. Certainly, the apparatus for forwarding a packet may further include some universal components such as an input/output apparatus (not shown), which is not limited herein in this embodiment of the present disclosure. The apparatus for forwarding a packet is a second NVE.

The receiver 1401 is configured to receive an NVO3 packet sent by a first NVE, where the NVO3 packet is obtained by the first NVE by performing NVO3 encapsulation on a first packet sent by a first tenant end system TES, and a destination IP address of the first packet is an IP address of a second TES.

The memory 1403 is configured to store program code, and the processor 1404 is configured to invoke the program code stored in the memory 1403, to execute the following operations: decapsulate the NVO3 packet, to obtain a decapsulated packet when a destination IP address in the NVO3 header of the NVO3 packet is an IP address of the second NVE, perform layer 2 termination on the decapsulated packet, acquire, according to a global VN ID in a tunnel header of the NVO3 packet, a layer 3 VPN instance identifier corresponding to the global VN ID, and forwarding the decapsulated packet to the transmitter 1402.

The transmitter 1402 is configured to search a routing and forwarding table according to the layer 3 VPN instance identifier and the IP address of the second TES, and forward the decapsulated packet to the second TES.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for forwarding a packet, comprising:
receiving, by a first network virtualization edge (NVE), a first packet from a first tenant end system (TES), a destination Internet Protocol (IP) address of the first packet being an IP address of a second TES, a destination media access control (MAC) address of the first packet being a gateway MAC address corresponding to the first NVE, and the first TES and the second TES belong to a same layer 3 virtual private network (VPN);
acquiring, by the first NVE, an access virtual network identifier (VN ID) of the first TES according to at least one of information about a port receiving the first packet or information on the first packet from the first TES;
acquiring a layer 3 VPN instance identifier of the first TES according to the access VN ID of the first TES;
performing, by the first NVE, layer 2 termination on the first packet;
searching, according to the IP address of the second TES, a routing and forwarding table corresponding to the layer 3 VPN instance identifier of the first TES, to obtain an entry corresponding to the IP address of the second TES;
encapsulating the first packet into a network virtualization overlays (NVO3) packet according to the entry; and
forwarding, by the first NVE, the NVO3 packet to a second NVE using a layer 3 network, the second TES being connected to the second NVE.

2. The method according to claim 1, wherein the entry corresponding to the IP address of the second TES comprises:
the IP address of the second TES;
an IP address of the second NVE to which the second TES is connected;
a gateway MAC address corresponding to the second NVE; and
a global VN ID corresponding to a layer 3 VPN instance identifier of the second TES, and
wherein the method further comprises encapsulating, by the first NVE, the first packet into the NVO3 packet according to the IP address of the second NVE, the gateway MAC address corresponding to the second NVE, and the global VN ID corresponding to the layer 3 VPN instance identifier of the second TES.

3. The method according to claim 2, wherein acquiring the access VN ID of the first TES, and acquiring the layer 3 VPN instance identifier of the first TES comprises:
acquiring, by the first NVE, the access VN ID of the first TES according to at least one of the information about the port receiving the first packet, a layer 2 virtual local area network (VLAN) identifier in the first packet, or a source MAC address of the first packet; and
acquiring the layer 3 VPN instance identifier corresponding to the access VN ID of the first TES.

4. The method according to claim 2, wherein encapsulating the first packet into the NVO3 packet comprises:
replacing, by the first NVE, the destination MAC address of the first packet with the gateway MAC address corresponding to the second NVE and replacing a source MAC address of the first packet with the gateway MAC address corresponding to the first NVE, to obtain the first packet after replacement; and
encapsulating, by the first NVE, an NVO3 header for the first packet after replacement, to generate the NVO3 packet, a destination IP address in the NVO3 header being the IP address of the second NVE, a source IP address in the NVO3 header being an IP address of the first NVE, and a VN ID in the NVO3 header being the global VN ID corresponding to the layer 3 VPN instance identifier of the second TES.

5. The method according to claim 1, wherein before receiving, by the first NVE, the first packet from the first TES, the method further comprises locally generating, by the first NVE, a table of a correspondence between access VN IDs and layer 3 VPN instance identifiers, and wherein acquiring the layer 3 VPN instance identifier of the first TES comprises searching, by the first NVE, the table of the correspondence between the access VN IDs and the layer 3 VPN instance identifiers according to the access VN ID of the first TES, to obtain the layer 3 VPN instance identifier of the first TES.

6. The method according to claim 5, further comprising:
locally generating, by the first NVE, a table of a correspondence between the layer 3 VPN instance identifiers and global VN IDs, the table of the correspondence between the layer 3 VPN instance identifiers and the global VN IDs being used by the first NVE to search for a corresponding layer 3 VPN instance identifier in response to the first NVE receiving an NVO3 packet from another NVE in a network;

generating, by the first NVE, a corresponding routing and forwarding table for each local layer 3 VPN instance identifier using an Address Resolution Protocol (ARP) and an exterior routing protocol;

sending, by the first NVE to another NVE in the network, an IP address of the first NVE, the gateway MAC address corresponding to the first NVE, the routing and forwarding tables, and the table of the correspondence between the layer 3 VPN instance identifiers and the global VN IDs; and receiving, from the other NVE, an IP address of the other NVE, a corresponding gateway MAC address of the other NVE, a routing and forwarding table corresponding to each local layer 3 VPN instance identifier of the other NVE device, and the table of the correspondence between the layer 3 VPN instance identifiers and the global VN IDs.

7. A method for forwarding a packet, comprising:

receiving, by a second network virtualization edge (NVE), a network virtualization overlays (NVO3) packet from a first NVE, the NVO3 packet comprising NVO3 encapsulation on a first packet of a first tenant end system (TES), and a destination Internet Protocol (IP) address of the first packet being an IP address of a second TES;

decapsulating, by the second NVE, the NVO3 packet to obtain a decapsulated packet in response to a destination IP address in an NVO3 header of the NVO3 packet being an IP address of the second NVE, the decapsulated packet being obtained based on replacing a destination media access control (MAC) address of the first packet with a gateway MAC address corresponding to the second NVE and replacing a source MAC address of the first packet with a gateway MAC address corresponding to the first NVE;

performing, by the second NVE, layer 2 termination on the decapsulated packet;

acquiring, by the second NVE according to a global virtual network identifier (VN ID) in the NVO3 header of the NVO3 packet, a layer 3 virtual private network (VPN) instance identifier corresponding to the global VN ID;

searching, by the second NVE, a routing and forwarding table according to the layer 3 VPN instance identifier and the IP address of the second TES; and forwarding the decapsulated packet to the second TES.

8. The method according to claim 7, wherein before receiving the NVO3 packet, the method further comprises locally generating, by the second NVE, a table of a correspondence between layer 3 VPN instance identifiers and global VN IDs, and wherein acquiring the layer 3 VPN instance identifier corresponding to the global VN ID comprises searching, by the second NVE, the table of the correspondence between the layer 3 VPN instance identifiers and the global VN IDs according to the global VN ID, to obtain the layer 3 VPN instance identifier corresponding to the global VN ID.

9. The method according to claim 8, further comprising:

locally generating, by the second NVE, a table of a correspondence between access VN IDs and the layer 3 VPN instance identifiers, the table of the correspondence between the access VN IDs and the layer 3 VPN instance identifiers being used by the second NVE to find a corresponding layer 3 VPN instance identifier according to an access VN ID of a TES;

generating, by the second NVE, a corresponding routing and forwarding table for each local layer 3 VPN instance identifier using an Address Resolution Protocol (ARP) and an exterior routing protocol;

sending, by the second NVE, the IP address of the second NVE to another NVE in a network, the gateway MAC address corresponding to the second NVE, the routing and forwarding tables, and the table of the correspondence between the layer 3 VPN instance identifiers and the global VN IDs; and receiving, from the other NVE in the network, an IP address of the other NVE, a corresponding gateway MAC address, a routing and forwarding table corresponding to each local layer 3 VPN instance identifier of the other NVE device, and the table of the correspondence between the layer 3 VPN instance identifiers and the global VN IDs.

10. An apparatus for forwarding a packet, comprising:

a receiver configured to receive a first packet from a first tenant end system (TES), a destination Internet Protocol (IP) address of the first packet being an IP address of a second TES, a destination media access control (MAC) address of the first packet being a gateway MAC address corresponding to a first network virtualization edge (NVE), and the first TES and the second TES belong to a same layer 3 virtual private network (VPN);

a memory coupled to the receiver and configured to store program code;

a processor coupled to the memory and the receiver and configured to execute the program code, wherein the program code causes the processor to be configured to:

acquire an access virtual network identifier (VN ID) of the first TES according to at least one of information about a port receiving the first packet or information on the first packet from the first TES;

acquire a layer 3 VPN instance identifier of the first TES according to the access VN ID of the first TES;

perform a layer 2 termination on the first packet;

search, according to the IP address of the second TES, a routing and forwarding table corresponding to the layer 3 VPN instance identifier of the first TES, to obtain an entry corresponding to the IP address of the second TES; and encapsulate the first packet into a network virtualization overlays (NVO3) packet according to the entry; and a transmitter coupled to the processor and configured to forward the NVO3 packet to a second NVE using a layer 3 network, the second TES being connected to the second NVE.

11. The apparatus according to claim 10, wherein the entry corresponding to the IP address of the second TES comprises:

the IP address of the second TES;

an IP address of the second NVE to which the second TES is connected;

a gateway MAC address corresponding to the second NVE; and a global VN ID corresponding to a layer 3 VPN instance identifier of the second TES, and wherein the program code further causes the processor to be configured to encapsulate the first packet into the NVO3 packet according to the IP address of the second NVE, the gateway MAC address corresponding to the second NVE, and the global VN ID corresponding to the layer 3 VPN instance identifier of the second TES.

12. The apparatus according to claim 11, wherein the program code further causes the processor to be configured to acquire the access VN ID of the first TES according to at least one of the information about the port receiving the first packet, a layer 2 virtual local area network (VLAN) identifier in the first packet, or a source MAC address of the first packet.

13. The apparatus according to claim 11, wherein the program code further causes the processor to be configured to:
  replace the destination MAC address of the first packet with the gateway MAC address corresponding to the second NVE and replace a source MAC address of the first packet with the gateway MAC address corresponding to the first NVE, to obtain the first packet after replacement; and
  encapsulate an NVO3 header for the first packet after replacement, to generate the NVO3 packet, a destination IP address in the NVO3 header being the IP address of the second NVE, a source IP address being an IP address of the NVE, and a VN ID in the NVO3 header being the global VN ID corresponding to the layer 3 VPN instance identifier of the second TES.

14. The apparatus according to claim 10, wherein the program code further causes the processor to be configured to:
  locally generate a table of a correspondence between access VN IDs and layer 3 VPN instance identifiers; and
  search the table of the correspondence between the access VN IDs and the layer 3 VPN instance identifiers according to the access VN ID of the first TES, to obtain the layer 3 VPN instance identifier of the first TES.

15. The apparatus according to claim 14, wherein the program code further causes the processor to be configured to:
  locally generate a table of a correspondence between the layer 3 VPN instance identifiers and global VN IDs, the table of the correspondence between the layer 3 VPN instance identifiers and the global VN IDs being used by the first NVE to search for a corresponding layer 3 VPN instance identifier in response to the first NVE receiving an NVO3 packet sent by another NVE in a network;
  generate a corresponding routing and forwarding table for each local layer 3 VPN instance identifier using an Address Resolution Protocol (ARP) and an exterior routing protocol;
  send an IP address of the first NVE, the gateway MAC address corresponding to the second NVE, the routing and forwarding tables, and the table of the correspondence between the layer 3 VPN instance identifiers and the global VN IDs to another NVE in the network; and
  receive an IP address of the other NVE, a corresponding gateway MAC address, a routing and forwarding table corresponding to each local layer 3 VPN instance identifier of the other NVE device, and the table of the correspondence between the layer 3 VPN instance identifiers and the global VN IDs, from the other NVE.

16. An apparatus for forwarding a packet, wherein the apparatus is a network virtualization edge (NVE), and wherein the apparatus comprises:
  a receiver configured to receive a network virtualization overlays (NVO3) packet from another NVE, the NVO3 packet being obtained by the other NVE by performing NVO3 encapsulation on a first packet from a first tenant end system (TES), and a destination Internet Protocol (IP) address of the first packet being an IP address of a second TES;
  a memory coupled to the receiver and configure to store program code;
  a processor coupled to the memory and the receiver and configured to execute the program code, wherein the program code causes the processor to be configured to:
    decapsulate the NVO3 packet to obtain a decapsulated packet in response to a destination IP address in an NVO3 header of the NVO3 packet being an IP address of the NVE, the decapsulated packet being obtained in response to replacing a destination media access control (MAC) address of the first packet with a gateway MAC address corresponding to the NVE and in response to replacing a source MAC address of the first packet with a gateway MAC address corresponding to the other NVE;
    perform layer 2 termination on the decapsulated packet;
    acquire, according to a global virtual network identifier (VN ID) in the NVO3 header of the NVO3 packet, a layer 3 virtual private network (VPN) instance identifier corresponding to the global VN ID; and
    search a routing and forwarding table according to the layer 3 VPN instance identifier and the IP address of the second TES; and
  a transmitter coupled to the processor and configured to forward the decapsulated packet to the second TES.

17. The apparatus according to claim 16, wherein the program code further causes the processor to be configured to:
  locally generate a table of a correspondence between layer 3 VPN instance identifiers and global VN IDs; and
  search the table of the correspondence between the layer 3 VPN instance identifiers and the global VN IDs according to the global VN ID, to obtain the layer 3 VPN instance identifier corresponding to the global VN ID.

18. The apparatus according to claim 17, wherein the program code further causes the processor to be configured to:
  locally generate a table of a correspondence between access VN IDs and the layer 3 VPN instance identifiers, the table of the correspondence between the access VN IDs and the layer 3 VPN instance identifiers being used by the NVE to find a corresponding layer 3 VPN instance identifier according to an access VN ID of a TES;
  generate a corresponding routing and forwarding table for each local layer 3 VPN instance identifier using an Address Resolution Protocol (ARP) and an exterior routing protocol;
  send, to another NVE in a network, the IP address of the NVE, the gateway MAC address corresponding to the NVE, the routing and forwarding tables, and the table of the correspondence between the layer 3 VPN instance identifiers and the global VN IDs; and
  receive, from the other NVE in the network, an IP address of the other NVE, a corresponding gateway MAC address, a routing and forwarding table corresponding to each local layer 3 VPN instance identifier of the other NVE device, and the table of the correspondence between the layer 3 VPN instance identifiers and the global VN IDs.

* * * * *